(12) United States Patent
Lowry (10) Patent No.: US 10,637,837 B1
(45) Date of Patent: Apr. 28, 2020

(54) METHOD AND SYSTEM TO SECURE HUMAN AND ALSO INTERNET OF THINGS COMMUNICATIONS THROUGH AUTOMATION OF SYMMETRIC ENCRYPTION KEY MANAGEMENT

(71) Applicant: Marpex, Inc., Steubenville, OH (US)

(72) Inventor: Douglas Bradley Lowry, Steubenville, OH (US)

(73) Assignee: MARPEX, INC., Steubenville, OH (US)

(*) Notice: Subject to any disclaimer, the term of this patent is extended or adjusted under 35 U.S.C. 154(b) by 0 days.

(21) Appl. No.: 16/698,246

(22) Filed: Nov. 27, 2019

(51) Int. Cl.
*H04L 29/06* (2006.01)
*H04L 9/08* (2006.01)

(52) U.S. Cl.
CPC .......... *H04L 63/0435* (2013.01); *H04L 9/088* (2013.01); *H04L 9/0861* (2013.01)

(58) Field of Classification Search
None
See application file for complete search history.

(56) References Cited

U.S. PATENT DOCUMENTS

| | | | |
|---|---|---|---|
| 4,751,733 A | 6/1988 | Delayaye et al. | |
| 6,078,667 A | 6/2000 | Johnson | |
| 6,185,304 B1 | 2/2001 | Coppersmith et al. | |
| 6,240,183 B1 | 5/2001 | Marchant | |
| 6,259,789 B1 | 7/2001 | Paone | |
| 6,304,657 B1 | 10/2001 | Yokota et al. | |
| 6,570,989 B1 | 5/2003 | Ohmori et al. | |
| 7,054,443 B1 | 5/2006 | Jakubowski et al. | |
| 7,340,606 B2 | 3/2008 | Belenky et al. | |
| 7,346,160 B2 | 3/2008 | Michaelsen | |
| 8,005,209 B2 | 8/2011 | Joshi | |
| 8,452,006 B2 | 5/2013 | Alekseev et al. | |
| 2004/0165721 A1 | 8/2004 | Sano et al. | |
| 2004/0247116 A1 | 12/2004 | Boren et al. | |
| 2008/0025497 A1 | 1/2008 | Ogram | |
| 2008/0123848 A1 | 5/2008 | Qiu et al. | |
| 2008/0144079 A1 | 6/2008 | Pandey et al. | |
| 2010/0115286 A1 | 5/2010 | Hawkes et al. | |
| 2010/0211801 A1 | 8/2010 | Kim et al. | |
| 2014/0380037 A1 | 12/2014 | Matsuda et al. | |
| 2015/0302218 A1* | 10/2015 | Fielder | G06F 16/17 713/193 |
| 2016/0379014 A1 | 12/2016 | Satpathy et al. | |
| 2018/0114030 A1* | 4/2018 | Sullivan | G06F 21/6218 |
| 2019/0261028 A1* | 8/2019 | Reynolds | H04W 12/001 |

OTHER PUBLICATIONS

"Substitution-permutation Ciphers; Linear Cryptanalysis," Dept. of Computer Science, Wellesley College.

* cited by examiner

*Primary Examiner* — Andrew J Steinle
(74) *Attorney, Agent, or Firm* — Carlson, Gaskey & Olds, P.C.

(57) ABSTRACT

A method according to an example of the present disclosure includes, obtaining an encrypted version of a shared reference file that is shared by a group of one or more confidants, receiving a request from a particular confidant in the group to encrypt a data segment for the group, and selecting a portion of the encrypted version of the shared reference file as an encryption key for the request. The selecting is performed based on a date and time of the request. The encryption key is used to encrypt the data segment. A computing device and computer program product are also disclosed.

18 Claims, 9 Drawing Sheets

Roster 150a of Baz Gibson

| Confidant Name ⌐210 | Date(s) ⌐220 | Added Data ⌐230 | Authentication Code ⌐240 |
|---|---|---|---|
| Abbot, Shirley | 2019/12/24 | E:\Internal\MarpxPrivacy\ABA0862.PET.enc | k5Rj1fD |
| Bridge Group | 2019/06/17 | | 56dUg4E |
| Chesterton, Nancy | 2018/11/11 to 2019/02/22 | | pp4St9B |
| Chesterton, Nancy | 2019/02/22 | | iE2YYch |
| Daleiden, Barney | 2019/09/04 | | OiAkTu8 |
| Deitmann, Ronald | 2020/01/13 | E:\Internal\MarpxPrivacy\ABA1922.PET.enc | 9d56Gf7 |
| Hill, Donna | 2019/08/31 | | LwdNCxe |
| Morrison, Duke | 2019/10/15 | | 9JixqQ4 |
| Sayre, Charles | 2019/10/11 | E:\Internal\MarpxPrivacy\ABA1044.PET.enc | Ny8RX3t |

Roster 150b of Charles Sayre

| Confidant Name ⌐210 | Date(s) ⌐220 | Added Data ⌐230 | Authentication Code ⌐240 |
|---|---|---|---|
| Gibson, Baz | 2019/10/12 | E:\Internal\MarpxPrivacy\ABA1044.PET.enc | Ny8RX3t |
| Wimbledon, Don | 2020/04/13 | | 7nSN0Ig |

METHOD AND SYSTEM TO SECURE HUMAN AND ALSO INTERNET OF THINGS COMMUNICATIONS THROUGH AUTOMATION OF SYMMETRIC ENCRYPTION KEY MANAGEMENT

BACKGROUND

The present disclosure relates to encryption, and more particularly to issues surrounding the use of symmetric keys in which the party encrypting content and the party decrypting it need access to the same key. Despite the speed and efficiency of symmetric key encryption in comparison to other methods, it has fallen into relative disfavor because of the onerous task of key management.

Symmetric key management typically entails these tasks: Create a new key for every data segment (e.g., file or message) to be made secure, record the key, keep it safe from hackers and eavesdroppers, securely transmit the key to other persons who are intended recipients, ensure that the recipients' use of the keys is in turn correct and safe, and arrange that keys are destroyed in a timely manner. These tasks combine to make "symmetric key management" so annoying and error prone that people in cybersecurity are hesitant to impose it upon lay people. As a result, encryption is left to the experts who are all too willing to make other people's content private, sometimes with a hidden cost—data mining of the content prior to encryption. In other words, third party experts hold the keys, and the end user loses control.

A dramatic reduction in the symmetric key management problem would constitute a major contribution to the privacy needs of individuals, the security needs of organizations and government, and the capacity of the cybersecurity industry to serve its many constituencies.

SUMMARY

A method according to an example of the present disclosure includes, obtaining an encrypted version of a shared reference file that is shared by a group of one or more confidants, receiving a request from a particular confidant in the group to encrypt a data segment for the group, and selecting a portion of the encrypted version of the shared reference file as an encryption key for the request. The selecting is performed based on a date and time of the request. The encryption key is used to encrypt the data segment.

In a further embodiment of any of the foregoing embodiments, obtaining the encrypted version of the shared reference file includes obtaining an authentication code that is shared by the group, and encrypting a shared reference file using the authentication code as an encryption key to obtain the encrypted version of the shared reference file.

In a further embodiment of any of the foregoing embodiments, the shared reference file is at least partially composed of random bytes of data.

In a further embodiment of any of the foregoing embodiments, obtaining the authentication code includes obtaining the authentication code from a roster of the particular confidant, and the roster includes an entry for the group that includes the authentication code for the group.

In a further embodiment of any of the foregoing embodiments, obtaining the authentication code includes utilizing a personal identification code of the particular confidant as an encryption key to decrypt the roster, and the roster includes a plurality of different authentication codes for a plurality of different groups of confidants to which the particular confidant belongs. The personal identification code is different from the authentication code and the encryption key.

In a further embodiment of any of the foregoing embodiments, the method includes adding a date-time stamp to the encrypted data segment that is based on the date and time of the request. The adding includes prepending the date-time stamp to the encrypted data segment, appending the date-time stamp to the encrypted data segment, or inserting the date-time stamp between a start and finish of the encrypted data segment.

In a further embodiment of any of the foregoing embodiments, the method is performed by an Internet-connected device and includes autonomously generating additional data segments. The selecting and encrypting steps are iteratively repeated for each additional data segment such that for each iteration, a new encryption key is determined and utilized, and for each iteration, the encrypted additional data segment is transmitted to each confidant in the group other than the particular confidant. The Internet-connected device is part of a single group of confidants, and the encrypted version of the shared reference file is pre-encrypted and stored at the Internet-connected device.

In a further embodiment of any of the foregoing embodiments, the selecting includes utilizing the date and time as indices to the encrypted version of the shared reference file.

In a further embodiment of any of the foregoing embodiments, the data segment is a first data segment and the encryption key is a first encryption key. The method includes receiving a second encrypted data segment from a confidant in the group, the second encrypted data segment different from the first encrypted data segment, selecting a portion of the encrypted version of the shared reference file as a second encryption key based on a date and time of a date-time stamp associated with the second encrypted data segment, and decrypting the second encrypted data segment using the second encryption key. The second encryption key is different from the first encryption key.

In a further embodiment of any of the foregoing embodiments, the method includes determining the date-time stamp from unencrypted bits added to the second encrypted data segment, the date-time stamp indicative of when the second encrypted data segment was encrypted.

A method according to an example of the present disclosure includes memory storing an encrypted version of a shared reference file that is shared by a group of one or more confidants. A processor is operatively connected to the memory. The processor is configured to obtain an encrypted version of the shared reference file that is shared by the group, receive a request from a particular confidant in the group to encrypt a data segment for the group, select a portion of the encrypted version of the shared reference file as an encryption key for the request with the selection being based on a date and time of the request, and encrypt the data segment using the encryption key.

In a further embodiment of any of the foregoing embodiments, to obtain the encrypted version of the shared reference file, the processor is configured to obtain an authentication code that is shared by the group, and encrypt a shared reference file using the authentication code as an encryption key to obtain the encrypted version of the shared reference file.

In a further embodiment of any of the foregoing embodiments, the shared reference file is at least partially composed of random bytes of data.

In a further embodiment of any of the foregoing embodiments, the processor is configured to obtain the authentication code from a roster of the particular confidant, the roster stored in the memory and including an entry for the group that includes the authentication code for the group.

In a further embodiment of any of the foregoing embodiments, to obtain the authentication code, the processor is configured to utilize a personal identification code of the particular confidant as an encryption key to decrypt the roster, and the roster includes a plurality of different authentication codes for a plurality of different groups of confidants to which the particular confidant belongs. The personal identification code is different from the authentication code and the encryption key.

In a further embodiment of any of the foregoing embodiments, the processor is configured to add a date-time stamp to the encrypted data segment that is based on the date and time of the request. To add the date-time stamp the processor is configured to prepend the date-time stamp to the encrypted data segment, append the date-time stamp to the encrypted data segment, or insert the date-time stamp between a start and finish of the encrypted data segment.

In a further embodiment of any of the foregoing embodiments, the computing device is an Internet-connected device that is part of a single group of confidants, and the encrypted version of the shared reference file is pre-encrypted and stored at the Internet-connected device. The processor is configured to autonomously generate additional data segments; iteratively repeat the selection and encryption steps for each additional data segment such that for each iteration, a new encryption key is determined and utilized; and for each iteration, transmit the encrypted additional data segment to each confidant in the group other than the particular confidant.

In a further embodiment of any of the foregoing embodiments, to select the portion of the encrypted version of the shared reference file, the processor is configured to utilize the date and time as indices to the encrypted version of the shared reference file.

In a further embodiment of any of the foregoing embodiments, the data segment is a first data segment and the encryption key is a first encryption key, and the processor is configured to receive a second encrypted data segment from a confidant in the group, the second encrypted data segment different from the first encrypted data segment. The processor is configured to select a portion of the encrypted version of the shared reference file as a second encryption key based on a date and time of a date-time stamp associated with the second encrypted data segment, and decrypt the second encrypted data segment using the second encryption key. The second encryption key is different from the first encryption key.

A computer program product according to an example of the present disclosure is stored in a non-transitory computer-readable medium and includes program instructions which, when run on a computing device, configures the computing device to: obtain an encrypted version of a shared reference file that is shared by a group of one or more confidants, receive a request from a particular confidant in the group to encrypt a data segment for the group, select a portion of the encrypted version of the shared reference file as an encryption key for the request with the selection being based on a date and time of the request, and encrypt the data segment using the encryption key.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The present disclosure describes a system for symmetric key encryption and key management which may be used in conjunction with any symmetric key encryption engine whatsoever that uses fixed length keys to encrypt/decrypt data segments, such as files and messages. The encryption engine is here treated as a black box which, when it receives content, a key, and an instruction, responds appropriately with an encrypted or decrypted equivalent of the content. The encryption engine may use any known symmetric key encryption technique for its operations. Therefore, the granular details of how the encryption engine operates are not discussed in detail. However, the operations of the encryption program that utilizes the encryption engine are discussed in detail. The system can support many users, some of whom choose to act as confidants to selected other users, with the expectation that they will exchange private material with one another repeatedly over time.

The techniques discussed herein supplement the encryption engine with the ability for each user to create and maintain a roster of confidants. The roster is protected in turn by encryption that uses for a key a personal ID code typically chosen by and known only to the user.

When confidants first agree to exchange content, they decide upon an authentication code unique to their agreement and typically known only to them. Each party enters that authentication code, together with the name of their fellow confidant, in their respective rosters. Each user may have many such confidant relationships and hence many authentication codes hidden within their roster. (In contrast, each user typically has one personal ID code to protect that roster.)

The method also calls for a shared reference file (e.g., of random bytes) to the collection of support files for the encryption program. This shared reference file is identical for every user in one example.

At program launch, the encryption engine decrypts the roster and places it in RAM, using a key extracted from the user's Personal ID code. During operations, the user selects a confidant. The encryption engine behind the scenes encrypts into RAM the shared reference file, using the authentication code for that roster entry. Time-based rotation of invisible keys derives from treating the encrypted version of the shared reference file as a block of time periods from which keys for encryption and decryption can be drawn automatically and invisibly to the user. During encryption, the implementation uses the current date and time to determine a location in the encrypted version of the shared reference file; from that location it extracts enough bits to construct a key for encryption. Each encrypted data segment has an associated date-time stamp indicative of the date and time when the data segment was encrypted. As an example, the date-time stamp may be appended to the encrypted data segment, and may optionally also be disguised. This date-time stamp is used in turn during decryption to determine the location of the specific block within the encrypted version of the shared reference file that should be used as the source of the key for decryption.

The outcome of the method is that, after initial setup of a roster entry for a confidant relationship (typically taking under a minute), the parties can exchange privatized content for years if they wish, with never any concern whatsoever for keys.

Because only setup is required, and no ongoing concern about keys, the method can be extended readily to secure information from Internet of Things sensors. The Internet of Things may benefit hugely from the efficiency of symmetric key encryption combined with automated key management.

Thus, the system disclosed herein may be utilized with almost any symmetric key encryption engine. The time-based rotation of invisible keys derives from confidants setting up a secretly shared authentication code that is used to encrypt a shared reference file provided with the program. The encrypted version of the shared reference file is treated as a block of time periods from which keys for encryption and decryption can be drawn. During encryption, the implementation uses the current date-time to determine a location in the encrypted random file; from that location it extracts enough bits to construct a key for encryption. Each encrypted file or message carries a (typically disguised) date-time stamp of the precise time at which it was encrypted. That stamp is used in turn during decryption to determine the location of the specific block within the encrypted random file that should be used as the source of the key for decryption. Confidants may exchange encrypted messages and files for literally years after the initial setup, in some embodiments, with no reference to or even thought of keys. The method can be applied very readily to the Internet of Things to enable highly secure exchange of information between a sensing device and the intended recipient server or other device.

Figure 1:
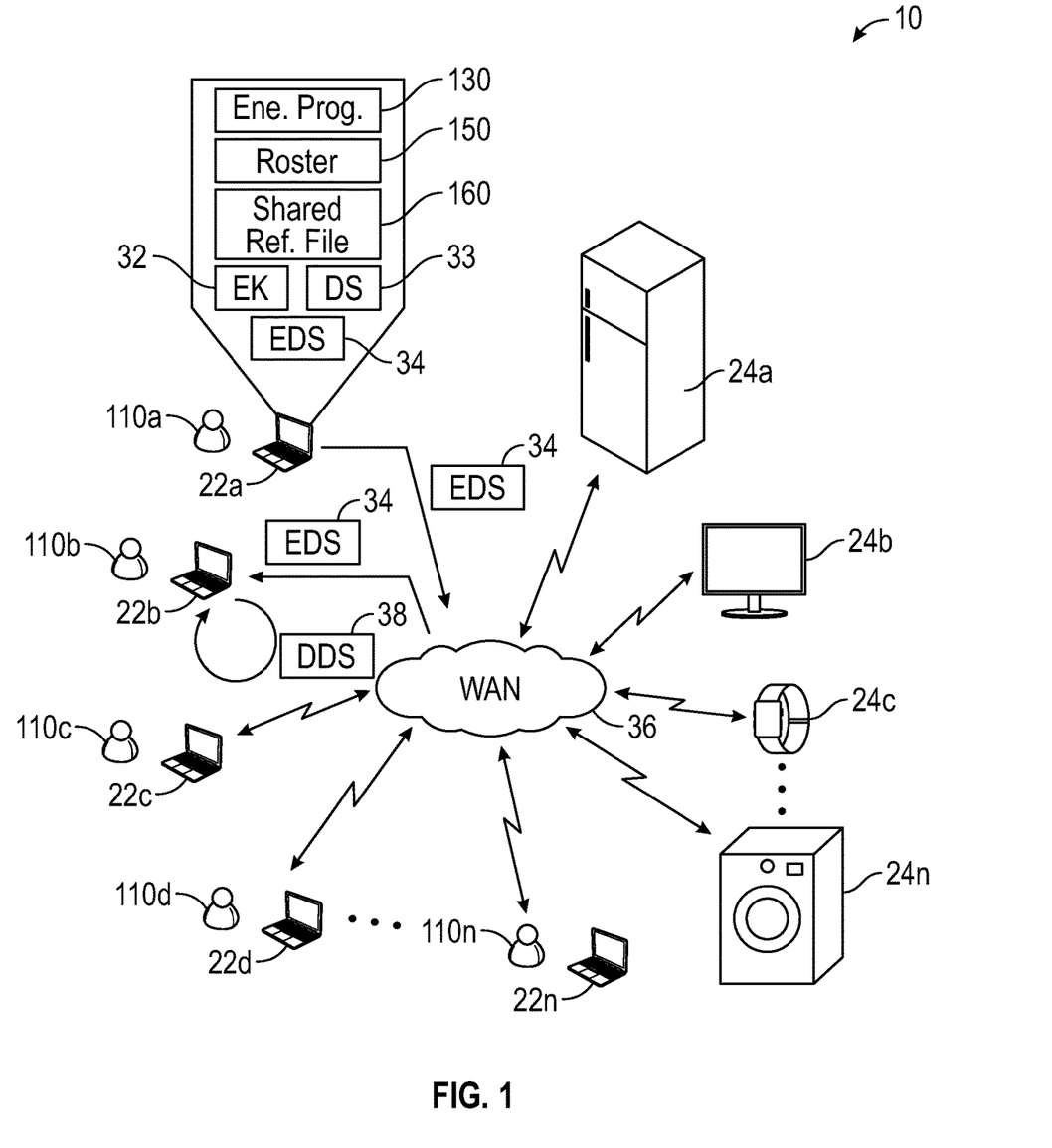
FIG. 1 schematically illustrates an example system for symmetric key encryption.

FIG. 1 schematically illustrates an example system 10 for symmetric key encryption. The system 10 includes a plurality of users 110A-N that each have a respective associated computing device 22A-N. As used herein, "N" as a numeral denotes that there can be any number of a given thing (e.g., any number of users 110, any number of computing devices 22, etc.). Although schematically depicted as laptops, it is understood that other types of computing devices 22 could be used (e.g., desktop computers, tablet devices, etc.) and it is further understood that one or more of the computing devices 22 could be a server.

Each computing device 22 has access to an encryption program 130, a roster 150, and a shared reference file 160. The shared reference file 160 is shared by each of the devices 22, 24. In one example, a majority of the shared reference file 160, or the entirety of the shared reference file 160 is composed of random bytes. As will be discussed below in greater detail, the encryption program 130 utilizes the roster 150 and an encrypted version of the shared reference file 160 to determine an encryption key 32 (EK) for use in encrypting a data segment (DS) 33 for a group of one or more users known as "confidants." Assume for now that users 110A-B are the sole members of a particular group of confidants.

In the example of FIG. 1, the encryption program 130 of computing device 22A has used the roster 150 and an encrypted version of the shared reference file 160 to obtain an encryption key 32, and uses the encryption key 32 to encrypt the data segment 33 to obtain encrypted data segment (EDS) 34. The computing device 22A transmits the EDS 34 through a wide area network (WAN) 36 (e.g., the Internet) to computing device 22B of user 110B, who is a confidant of user 110A. The computing device 22B receives the EDS 34 and utilizes its own roster 150 and an encrypted version of its copy of the shared reference file 160 to obtain the encryption key 32, and uses the encryption key 32 to decrypt the EDS 34 and obtain a decrypted data segment (DDS) 38 that contains the data of the data segment 33.

A plurality of Internet of Things ("IOT") devices 24A-N are also included in the system 10. The IoT devices 24 may also operate as users 110 in the system 10 by autonomously generating data, encrypting that data, and transmitting the data via a wide-area network (WAN) 36 (e.g., the Internet). Although the IoT devices depicted in FIG. 1 are a refrigerator 24A, television 24B, smartwatch 24C, and washing machine 24N, it is understood that these are non-limiting examples of IoT devices, and it is further understood that other types of IoT devices could be used. Also, although the IoT devices 24 are labeled separately from the computing devices 22, any feature attributed to a computing device 22 may be performed by an IoT device 24 unless otherwise indicated herein. Also, although the IoT devices 24 may operate without human interaction, they can still operate as users 110 in the system 10.

Figure 2:
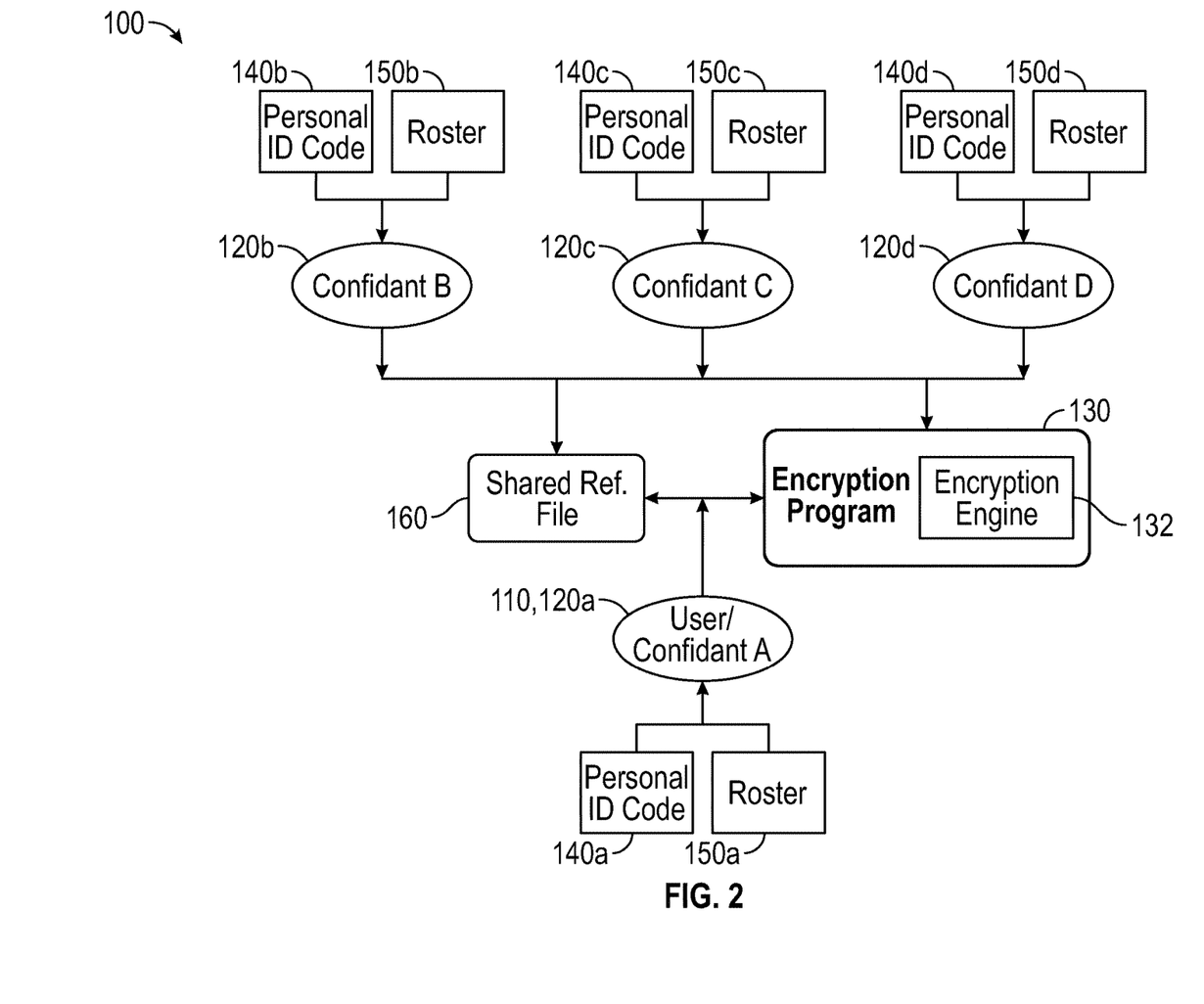
FIG. 2 schematically illustrates persons and components involved in use of the method.

FIG. 2 schematically illustrates persons and components involved in use of the system 10. For our purposes a user 110 is any one of many people who gain access to the encryption program 130 and put it to use. A confidant 120 is a user 110 who has entered into an ongoing relationship with one or more other users 110 in order to exchange data segments such as messages and computer files securely with one another. As shown in FIG. 2, the encryption program 130 utilizes an encryption engine 132 to perform encryption and decryption operations. No gender implications are intended by use of the term confidant instead of confidante.

Many users 110 over time establish relationships with a plurality of other persons who become confidants 120B, 120C, 120D, with the effect that a user 110 in turn becomes a confidant 120A. All confidants 120 acquire access to the encryption program 130. In one example, the encryption engine 132 operates as described in this inventor's U.S. Pat. No. 10,505,715. However, the encryption engine 132 may be almost any symmetric key computer encryption/decryption software whatsoever, provided only that it supports automated symmetric keys as described herein.

Each confidant 120 is prompted by the encryption program 130 when it is launched for the first time to devise and enter a personal identifier code 140. In order to retain control and maintain secrecy, confidants 120 should keep their personal ID code 140 secret from everyone else, including the provider of the software. The personal ID code 140 shall be of sufficient length and complexity that either the personal ID code 140 itself or some collection of bits derived from it may serve as a key for encrypting the roster file 150 (e.g., typically 7 or more bytes).

Figure 3:
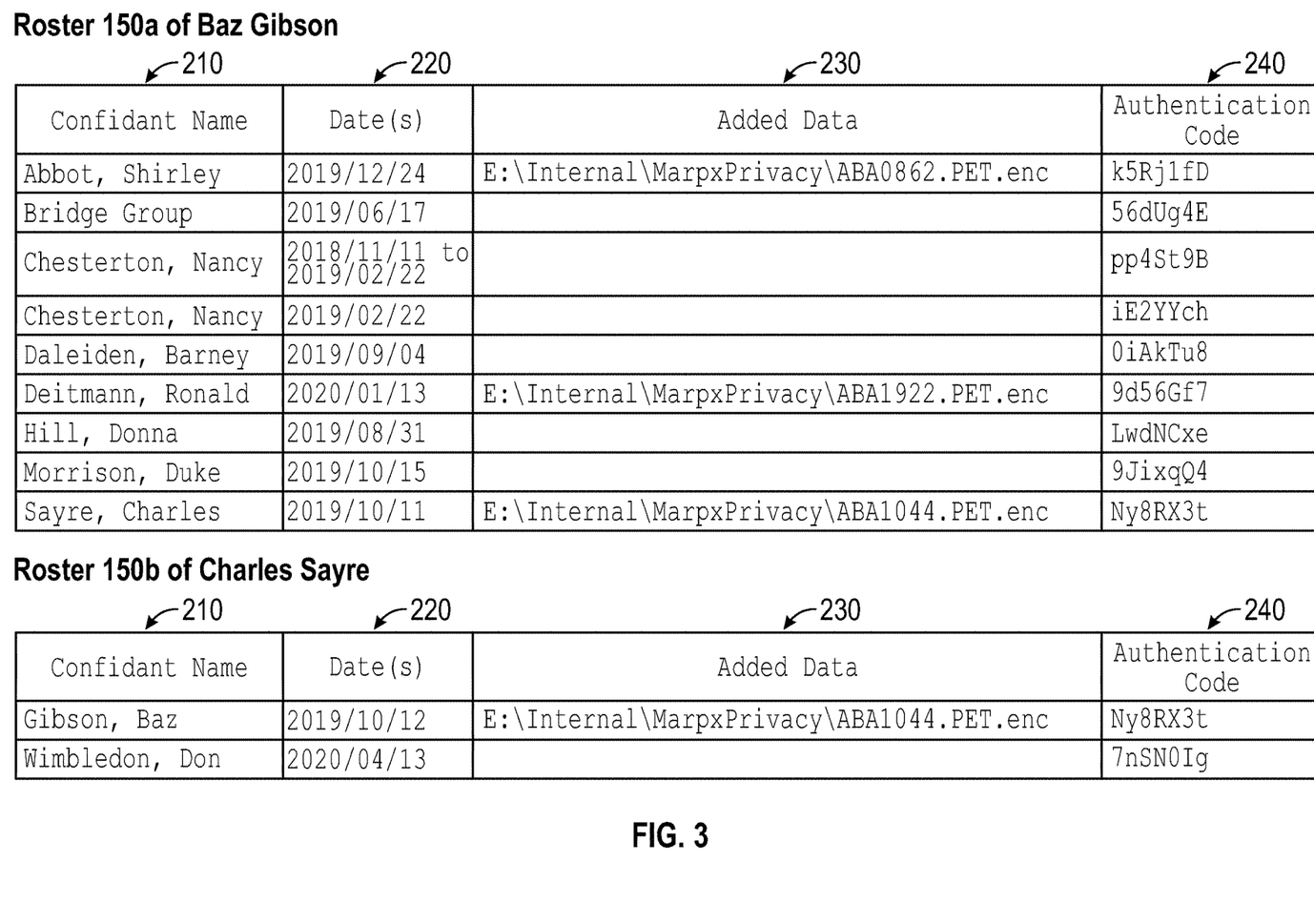
FIG. 3 is an example of two rosters of persons in which one confidant relationship is shared.

Examples of roster files 150 are shown in FIG. 3 and are explained below. It is unlikely that any two roster files 150 would be the same, because each confidant 120 has his/her own list of persons with whom private messages and files are to be exchanged. Data within the roster 150 is sensitive, and should be kept secret; hence the use of a secret personal ID code 140 to decrypt the stored encrypted roster file 150 into RAM at each program launch of the encryption program 130.

Each user 110 also has access to the shared reference file 160, which in examples is partially or entirely composed of random bytes; it is the same for every user 110. Use of the shared reference file 160 is explained in greater detail in connection with FIG. 7.

FIG. 3 presents two examples of roster files 150A-B, one for each of two users 110 in which each is a confidant 120 of the other. In the example of FIG. 3, each roster 150 entry contains a plurality of records which each include the following fields: a confidant name 210, one or more dates 220, added data 230 (optional), and an authentication code. Although the rosters 150A-B are depicted in a table format, it is understood that they could be saved in another format, such as comma or semicolon delimited files.

A user 110 selects a particular confidant 120 from a displayed list when it is time to make private (i.e., encrypt) or to reconstitute (i.e., decrypt) one or more data segments (e.g., files or messages). Hence, a confidant name 210 is useful in a dropdown box or similar style display. In one example, when there are changes to the roster 150, the roster 150 is reworked into alphabetic order of the confidant names 210 in order that a person reading the display may arrive quickly at the desired entry. In one example, to facilitate selection, the confidant name 210 is displayed on the screen, hence it is treated as non-secret data.

The date(s) 220 within an entry begins with the date at which the roster entry was initiated. There may in some instances be an ending date, as in the Nancy Chesterton entry in roster 150A. This might happen, for example, when a confidant 120 feels that an authentication code 240 may have been compromised. The older entry is retained in the roster so that content from the earlier period may still be decrypted. Hence, there may be multiple entries with the same confidant name 210. In that event, display of the date 220 in conjunction with the name 210 clarifies the selection choice. The date(s) 220 may also be treated as non-secret data.

Added data 230 may optionally be included in a roster 150 entry. In the example in FIG. 3, the examples of added data 230 are paths to optional files that may be used by the encryption engine 132 for encryption and/or decryption operations (e.g., file paths to extended encryption keys). Added data 230 that affects encryption should be kept secret and is typically not open to revision, since a change may interfere with decryption of material that was privatized earlier. When change is desired in any secret field, a new entry should be added.

There is one authentication code 240 for each entry within the roster 150 of a confidant 120. This authentication code 240 is sensitive data. It serves as a key to encrypt the shared reference file 160, thus generating a source of keys that is typically accessible to no-one other than the two confidants 120. In some embodiments, no person at all knows the key that is used for any one encryption or decryption of a data segment; it is totally automated and invisible. A key cannot be provided to hackers through thoughtlessness or coercion when it is not known to either confidant 120. In the example of FIG. 3, the authentication codes 240 are all seven characters in length, with each of 62 possible choices (26 capital letters, 26 lower case letters, and 10 numeric digits) for each of the seven characters. In this example, there are over 3.5 trillion such combinations (62 to the power 7). Of course, it is understood that other authentication code lengths could be used in other examples (e.g., more or fewer than seven characters).

It is entirely appropriate to select oneself as a confidant 120; this enables encryption and later decryption of messages and files archived for one's personal benefit. The authentication code 240 in this example is typically shared with no-one. The "self-confidant" 120 under this arrangement may archive content, safely store it anywhere including in the cloud, and reconstitute it as plaintext whenever needed. In such an example, the user 110 is the only member of their "group" of one or more confidants.

In the first roster 150A in FIG. 3, there is a confidant name 210 "Bridge Group". It illustrates the fact that a confidant 120 may be a team/multiple persons. To set up this form of relationship, the authentication code 240 is shared, preferably securely, with each of the persons, and each builds it into their respective rosters 150.

Note also in FIG. 3 that the roster 150A of Baz Gibson includes an entry for Charles Sayre. In addition, the roster 150B of Charles Sayre includes an entry for Baz Gibson. In other words, each is a confidant 120 of the other. Note further that the dates 220 are not quite identical; Charles was a day later in updating his roster 150. However, the added data 230 and the authentication code 240 are identical in their two rosters 150. Both of these fields were shared securely between the two of them prior to updating their respective rosters 150.

Figure 4:
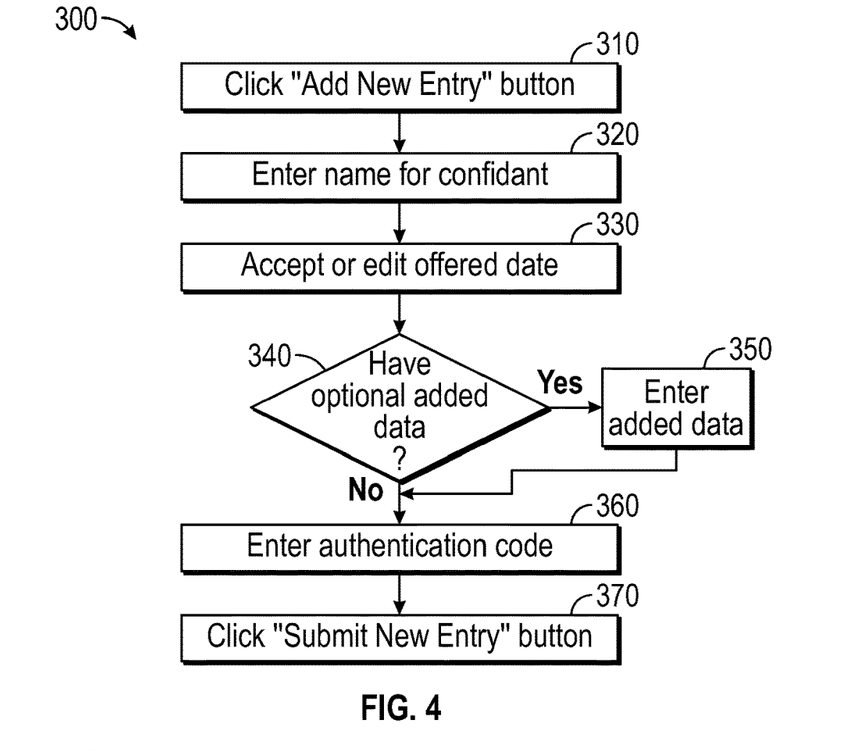
FIG. 4 is a flowchart of an example method to add a new confidant to a roster.

FIG. 4 is a flowchart of an example method 300 to add a new confidant 120 to a roster 150. Recall that the user 110 input his/her personal ID code 140 on entering the program. That ID code 140 was used in turn as the key or basis for the key to decrypt the roster file 150 into RAM.

The user 110 selects the Add New Entry button (step 310). The encryption program 130 launches a display with an input box for each field in the roster. In one example, entry in the name field for the new confidant 120 is required. Either surname or given name may be entered first, but whatever the choice, it should be consistently given name OR surname always first, so that the (automatic) alphabetic ordering of names will make sense. The user 110 enters name for the confidant (step 320).

The encryption program 130 offers a date to the user 110, which the user 110 may accept or edit (step 330). In one example, the current date is offered in the universally understood yyyy/mm/dd format. The user 110 may alter the content in this field if desired. The user 110 may also add optional data for the "added data" field 230 (step 340), which if provided is entered (step 350).

The user 110 also enters the authentication code 240 (step 360), which is the most important piece of information. The field 360 may be shown twice to ensure that a consistent code is entered in password mode (i.e., not visible to onlookers).

When the user 110 is satisfied with the content of each field, he/she clicks on the Submit New Entry button (step 370). The encryption program 130 reorders the entries alphabetically by name, revises the plain text version of the roster 150 in RAM, encrypts it, and overwrites the encrypted roster 150 file for the user 110.

The above constitutes the entire setup of a new relationship whereby the two parties may exchange files and messages securely. After this initial setup, the confidants 120 may use the encryption program 130 to communicate with each other, and may see no keys for however many months or years the sharing relationship continues.

Figure 5:
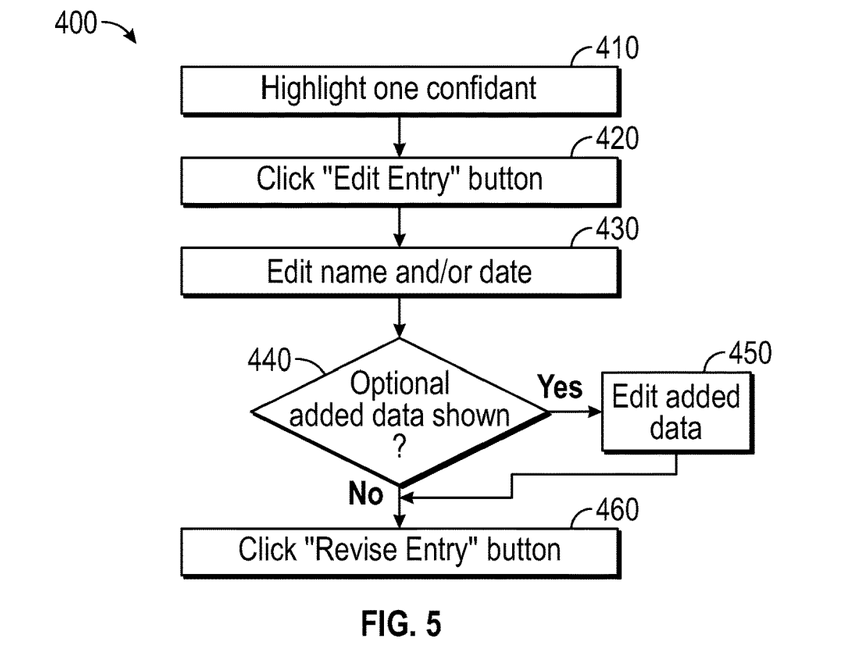
FIG. 5 is a flowchart of an example method to edit a confidant entry in a roster.

FIG. 5 is a flowchart of an example method 400 to edit a confidant 120 entry in a roster 150. To edit a roster 150 entry, the user 110 first highlights one confidant 120 in the roster 150 list displayed by the encryption program 130 (step 410). From there, the user 110 clicks an Edit Entry button (step 420) and reviews any entries that need to be changed. Typically only the non-secret fields are displayed. Revisions may optionally be made to the name 210 and date 220 fields (step 430). Added data 230 may optionally be displayed (step 440) and be revised (step 450). In one example the editing of step 450 is only approved if it has no impact on the encryption or decryption process performed by the encryption engine 132 of the encryption program 130.

When the user 110 is satisfied with the content of each field, he/she clicks on the Revise Entry button (step 460). As with new entries 300, the encryption program 130 reorders the entries alphabetically by name, revises the plain text version of the roster 150 in RAM, encrypts this revised version, and overwrites the encrypted roster 150 file for the user 110.

Figure 6:
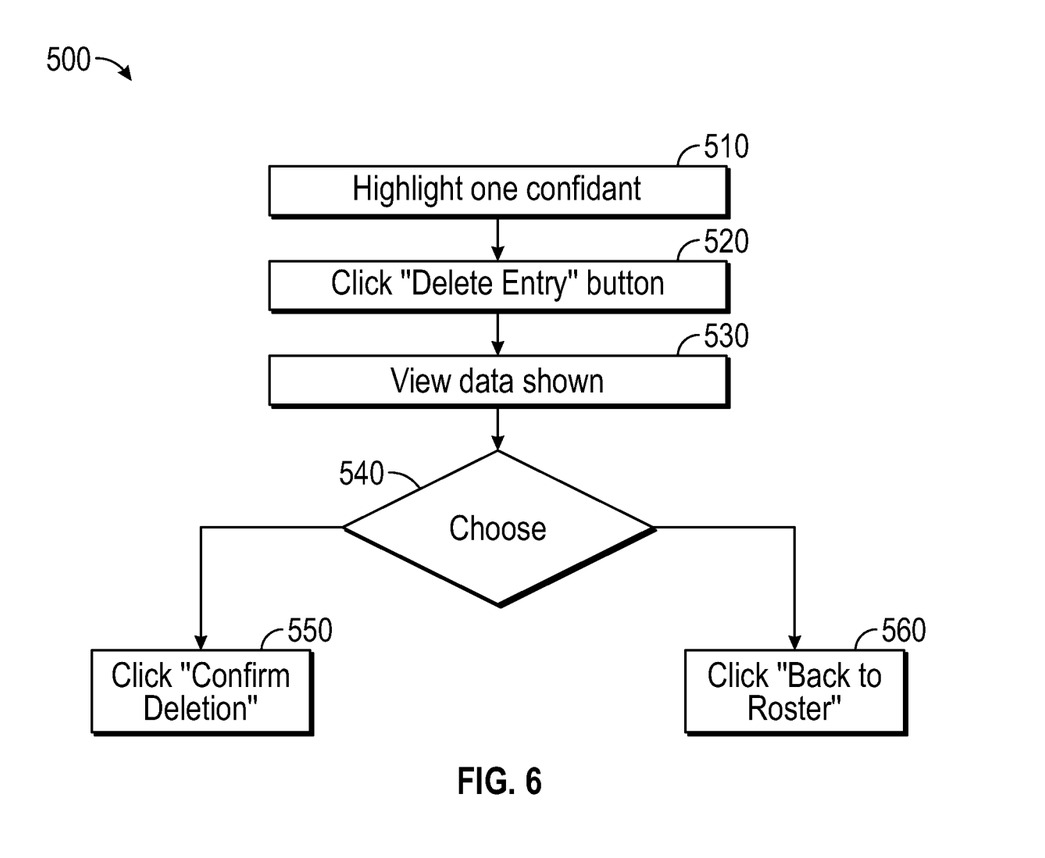
FIG. 6 is a flowchart of an example method to delete a confidant from a roster.

FIG. 6 is a flowchart of an example method 500 to delete a confidant 120 from a roster 150. Here too the user 110 first highlights one confidant 120 in the roster 150 list displayed by the encryption program 130 (step 510). He/she then clicks on the Delete Entry button (step 520), and views the non-secured fields (step 530). The user 110 is presented with a choice in step 540 to either click on the Confirm Deletion button (step 550) or on the Back to Roster button (step 560), should deletion no longer be wanted. As with new entries 300, the encryption program 130 reorders the entries alphabetically by name, revises the plain text version of the roster 150 in RAM, encrypts it, and overwrites the encrypted roster 150 file for the user 110.

Figure 7:
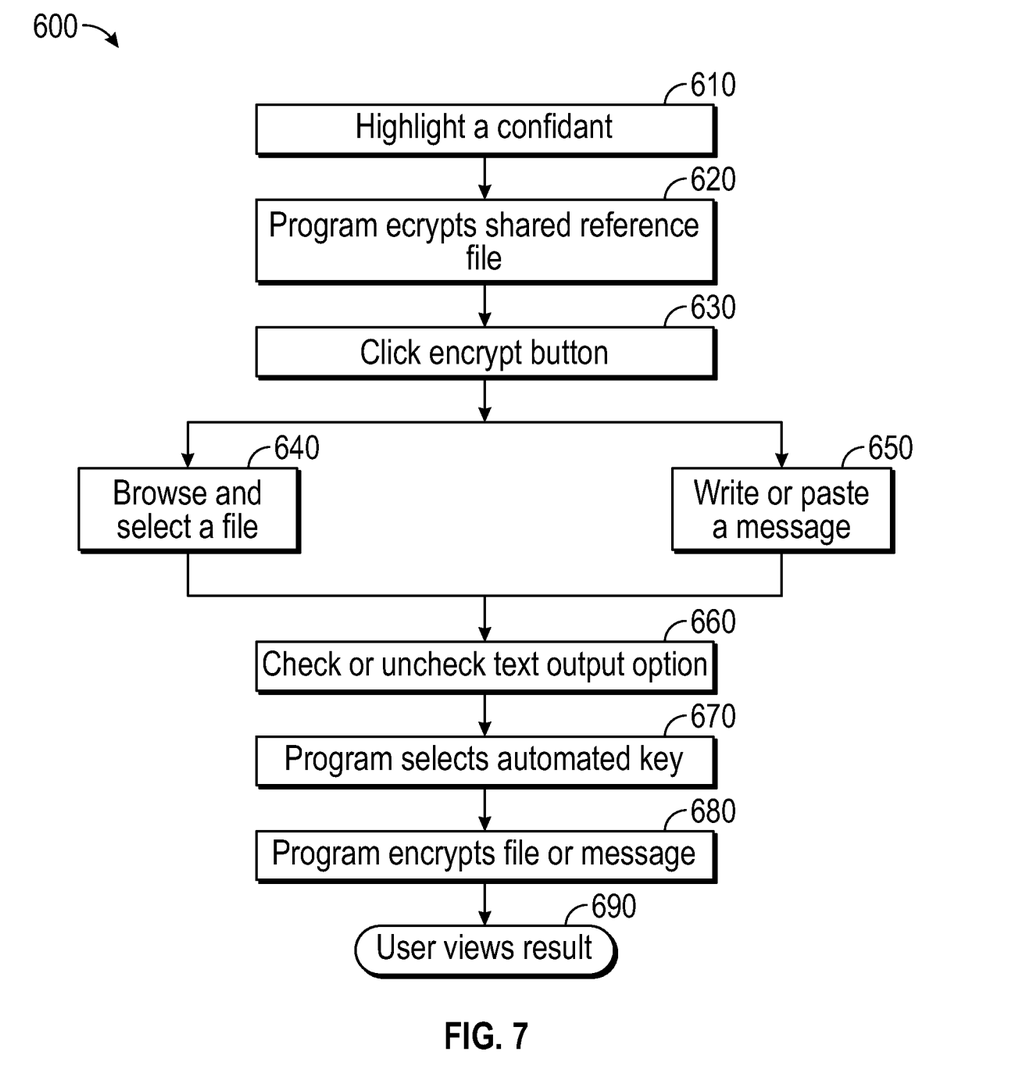
FIG. 7 is a flowchart of an example method to privatize content to relay to a confidant.

FIG. 7 is a flowchart of an example method 600 to privatize content to relay to a confidant 120. The process starts as the user 110 selects a confidant 120 from the dropdown list display (step 610).

When a confidant 120 is highlighted, the encryption program 130 uses the authentication code 240 in that confidant's 120 entry to encrypt the shared reference file 160 in RAM (step 620).

The user 110 clicks the Encrypt button (step 630), then may either browse and select a computer file (step 640) OR input (type or paste) a message (step 650) to be encrypted. There is also a checkbox that may be used (step 660) to determine whether the encrypted content is to be wrapped in text in the conventional Base64 format. Text wrap is preferred for messages since they are often transmitted within email attachments, which in binary format are highly vulnerable to unwelcome change by the email software. However, it is understood that text wrap is optional and need not be used for all messages if not desired.

Use of the shared reference file 160 by the encryption program 130 will now be described in greater detail. In one example implementation, the shared reference file 160 is a 54,000 byte collection of random bytes named random.dat. Of course, other shared reference files 160 could be used, such as a file that is only partially composed of random bytes, or that is composed of plain text. The shared reference file 160 is typically identical for every user 110. In other examples, different subsets of users could use their own shared respective reference files. The shared reference file 160 is loaded and held in memory through each session. Memory is set aside to hold also one at a time various encrypted versions of the shared reference file 160, with each being encrypted according to a different authentication code from a user's roster 150.

When one encrypts a random file or a partially random file or even a plain text file, the output is a reasonably random file. By keeping the authentication code 240 secure, the pair of confidants 120 ensure that this output is accessible only to them alone in the world. In some embodiments, not even the software provider or designer have any ability to access content in the encrypted random bytes file 160. This design property effectively assures that the user 110 is fully in control of privatizing (i.e., encrypting) and reconstituting (i.e., decrypting) his/her content.

When the user 110 submits the data segment 33 (e.g., file or message) for encryption, the encryption program 130 notes the current date and time of the request (e.g., measured in seconds) and uses that as a basis to reach into the encrypted version of the shared data file 160 in an automated manner to select an encryption key (step 670). In one example implementation in which the shared reference file 160 includes 54,000 bytes, six of the bytes (that is, 48 bits) are set aside for each fifteen minute interval over three months. There are 96 intervals in a day; that works out to 96×6=576 bytes for each day. Months max out at 31 days; that's 31×576=17,856 bytes for each month. Altogether, 3×17,856=53,568 bytes are needed. A little more is added as a precaution against end conditions, then rounded up arbitrarily to 54,000 bytes.

The encrypted 54,000 byte file in RAM is treated as a calendar quarter with midnight January 1, April 1, July 1, and October 1 each pointing to the start of the file. To select a specific six byte segment, the 54,000 byte version will be advanced 17,856 bytes for each month completed, 576 bytes for each day completed, and 6 bytes for each fifteen minute interval completed. Example: May 15 of any year at 12:37 p.m. starts at 1×17,856+14×576+50×6=byte number 26,220.

The 96 intervals per day is arbitrary. Programmers could just as well opt for a one month array of six byte spans, with the pseudo-keys changing literally every two seconds. (A pseudo-key is a string of characters in which each character points to a much longer binary string, and that collection of longer strings makes up the key that is actually used to encrypt or decrypt.) With 43,200 intervals per day, that would require something just over 43200×31×6=8,035,200 bytes.

Whatever the interval and the file size, the six byte span is used the same way. Think of the six bytes as 48 bits, which are readily broken down into eight values, each a six bit integer. That puts them in the range 0 to 63.

To encrypt a file or message, the encryption program 130 checks the current date/time which may be received as a count of seconds since 12:00 a.m. UTC/GMT Jan. 1, 1970 or as a count of 100-nanosecond intervals since Jan. 1, 1601, for example. The program navigates to the equivalent month-day-time interval position in the encrypted random bytes, and selects the beginning point for the appropriate six byte interval.

Values 0 through 61 each map to one of the 62 alphanumeric characters 0-9 A-Z a-z. Assign seven characters in accord with the values found in the 8 six-bit values. Ignore a value 62 or 63, and go on to the next six bits. (If there happens to be more than one value 62 or 63, there is no harm done by going into the beginning of the next set of 6 bytes or into the end condition cushion at the end of the file.)

The result is a seven alphanumeric key or pseudo-key, unknown to anyone, not even the confidants 120. If it serves as a pseudo-key, its characters map to longer strings which are used by the encryption engine 132 to encrypt the designated file or message (step 680). Thus, in the example above the month, day, and time of day are used as indices to obtain a byte segment, and bits from the byte segment to use as the encryption key 32. Of course, other selection methods could be used (e.g., using time as a first index for initial byte selection, and date as one or more subsidiary indices for a selection of a portion of the initial byte selection).

The encryption program 130 adds a date-time stamp indicative of the date and time used in determining the encryption key 32 in a tiny disguised (not encrypted) segment at the end of every data segment that it encrypts. This could include appending the date-time stamp to the encrypted data segment 34, prepending the date-time stamp to the encrypted data segment 34, or inserting the date-time stamp at an intermediate location in the encrypted data segment 34 that is between a start and finish of the encrypted data segment 34. The date-time stamp typically remains unencrypted even when added to the encrypted data segment 34.

The encryption program 130 reports to the user 110 the name and location of the encrypted version of the data segment 33 (step 690). If the original is a reasonably brief message in Base64 format, that may also be displayed as a convenience to the user 110 who would like to copy and paste the privatized content into social media, an email, or a document.

Figure 8:
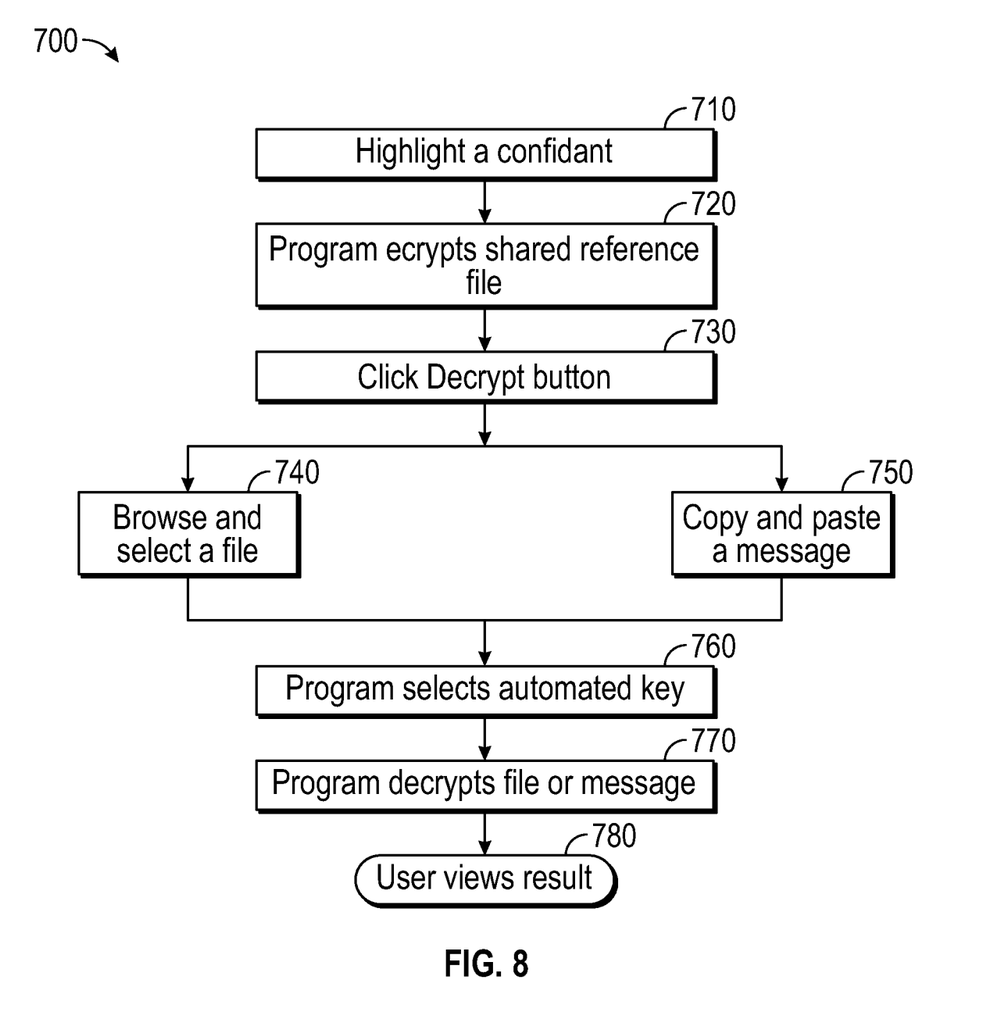
FIG. 8 is a flowchart of an example method to reconstitute content received from a confidant.

FIG. 8 is a flowchart of an example method 700 to reconstitute encrypted content received from a confidant 120. The encryption program 130 encrypts the shared reference file 160 (step 720), and follows a process very similar to the encryption sequence in FIG. 6. In what follows, the similarities are simply mentioned; the differences are explained.

The user 110 highlights a confidant 120 (step 710), as in step 610. If the highlight was already in place from the preceding operation, the highlight 710 and encrypting 720 steps are skipped.

If a new highlight is offered in step 710, the shared reference file 160 is not already encrypted per this user's 110 authentication code 240, so that encryption step 720 is carried out by the encryption program 130.

The user 110 clicks on the Decrypt button (step 730), then either browses and selects an encrypted file (step 740) from the confidant 120 (or self as a confidant), OR copies and pastes a message 750 that was received in a visual text display (step 750). In the example program, the message is enclosed between markers<<< and >>> as in <<< 0HpI.R1B kIb6G19R rEjdSLCc 7A8s4loZ wjHIzkEr GyivES3r qeFP-mRsF heVbosXj idPpR!uC agQ3hup6 iPg75q!d KLZC-fYUV pB92hUql yCC3aLnw bnLaFo.z 0zdXXs89 RL36JpwA Z.que0Uv gvvGKKSc s5ev3af1 DrB1j.J! MJWxx2oI Oa5U>>>. The markers should be included in what is copied (from email, social media, Facebook page, wherever) and pasted into the current decryption interface page.

As in the encryption step 670, the decryption process also reaches into the encrypted version of the shared reference file 160 to select an automated key (step 760). Instead of the current time, the program uses the date-time stamp that was included in a brief disguised add-on at the start, near the end, or within the encrypted content. That returns the encryption key (invisible to everyone) that was used to encrypt the content earlier. The encryption program 130 in turn decrypts the input (step 770).

Here too the user 110 views results (step 780), in the form of the name and location of the decrypted file. This display is followed in certain cases by the plain text.

Figure 9:
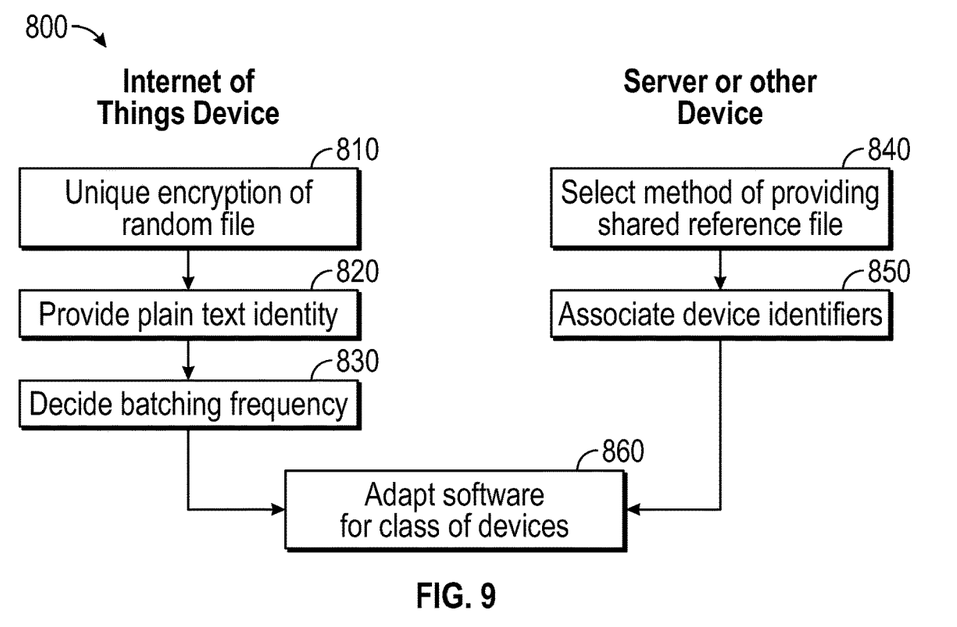
FIG. 9 presents design considerations that affect setting up in advance the capacity for secure communication between an Internet of Things sensor device and either a server or another device.

FIG. 9 is a flowchart 800 that presents design considerations that affect setting up in advance the capacity for secure communication between an Internet of Things sensor device and either a server or another device.

Internet of Things ("IoT") devices include everything from insulin pumps, thermostats, auto and aircraft controls, . . . all the way to toys. IoT devices are configured to autonomously generate, encrypt, and transmit data segments. IoT devices are manufactured typically in large quantities with each unit identical to the next. In some cases, hacking and substitution of false data of IoT devices may have serious consequences . . . as for example interfering with someone's heart pace maker, or turning all the traffic lights in all directions to green at the same time at one intersection or (worse) throughout a city. In vulnerable situations, proficient security protection is worth the cost of adding a unique element to IoT devices.

A uniquely pre-encrypted version of the shared reference file 160 is provided (step 810) to the software in an IoT device or batch of devices to establish a base for automated key selection. Costs are lower if the same such file is used across a class or a subset group of a device. Security is greater if a different and totally unique such file is built into every device's software. That design decision hinges upon the amount of mayhem and the risk level associated with adversarial compromise of the data flow.

Notice that the IoT device may function better with a version of the shared reference file 160 that is already encrypted using an authentication code shared with the server or other device, as this enables the IoT device to avoid use of a roster. An adversary who extracts the pre-encrypted version of the shared reference file has no knowledge of how it was created and no access to the device or server at the other end of the data exchange.

There are already in place methods by which IoT devices self-identify themselves to servers or other devices. That identification (step 820) remains in plain text or is disguised, and is typically not encrypted prior to transmission.

Devices may give the appearance of continuous analog data reporting. That is an illusion. Data is still sent in small digital packets, consistent with the design of the Internet. Should data from a device be accrued in batches and sent periodically (for example, reporting only every 15 seconds) or should data changes appear smooth? In the latter case, it would be technically feasible to encrypt the content held within individual Internet packets. Decisions on the batching frequency (step 830) depend on the nature of the task and the associated data needs at both ends of the communication.

Now consider the server or other device that is exchanging information with an IoT device.

Both possibilities are open, whether the shared reference file 160 or a pre-encrypted version of it (identical to that on the IoT device) is present at the server or other device. One of these two possibilities is chosen (step 840). The more uniquely different pre-encrypted files on remote IoT devices that are managed by this one recipient, the more benefit there is to having the raw unencrypted shared reference file 160 only. But that in turn requires a safe method of associating device identifiers (step 850) with the various authentication codes 240 that have been used to encrypt the files on the remote IoT devices.

Automating symmetric key management for IoT communications involves some adaptation to the software (step 860) at both the IoT and the server (or other device) end. The adaptation is typically a single project, rather than an ongoing series of tasks.

Figure 10:
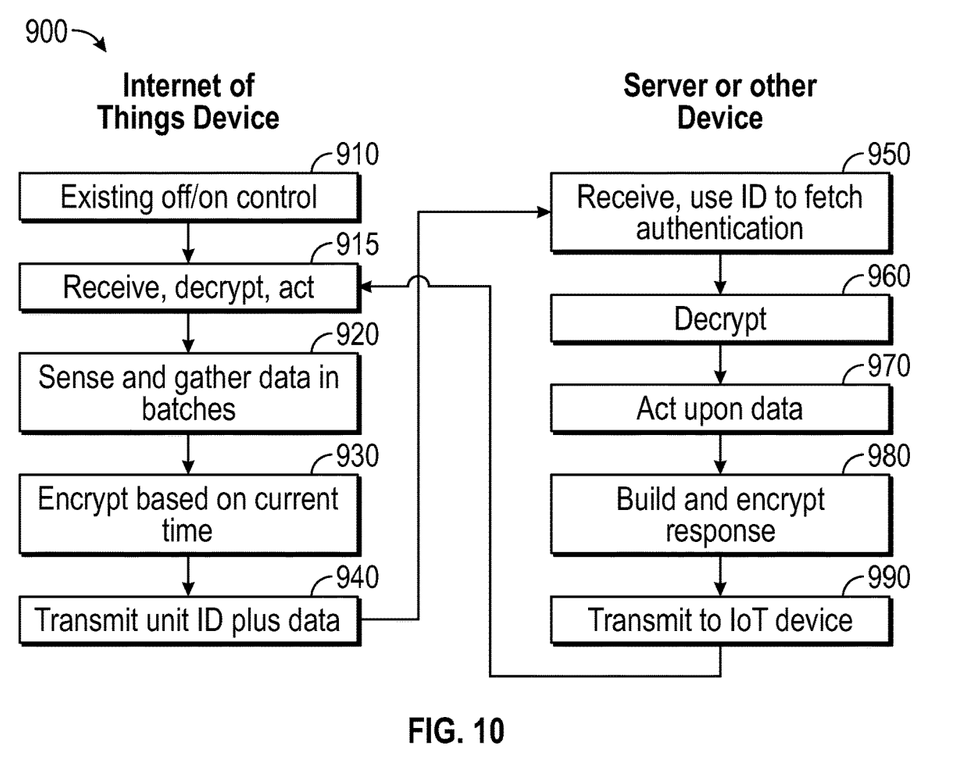
FIG. 10 is a flowchart of an example method to exchange information securely through extended lengths of time between an Internet of Things sensor device and either a server or another device.

FIG. 10 is a flowchart 900 of an example method to exchange information securely over extended lengths of time between an Internet of Things sensor device and either a server or another device.

Focus first on the Internet of Things device and what happens at that end of the communication.

The IoT devices' existing off/on, sensing, data gathering, response, and other functions are all performed (step 910).

From time to time the IoT device receives transmissions 915. Since the encrypted version of the shared reference file 160 is already in place, decryption of an incoming transmission amounts to removing the disguise from the transmission's date-time stamp, using that as a basis to determine the appropriate automated key (exactly as in 760), and decrypting the message as in 770. The IoT device then acts upon the information received per its existing protocols (step 915).

The IoT device is designed to sense information and collect it. Based on design decisions described in FIG. 9, sensed data is gathered into batches (step 920). The current date and time serves as a basis to extract a key from the encrypted version of the shared reference file 160 and then encrypt the batch of outgoing data (step 930). This is then transmitted (step 940) to the server or other device along with the standard information that identifies this particular IoT device.

Consider what happens at the other end—the server or other device. It receives a transmission from the IoT and uses the ID received along with the data to determine either the associated authentication code OR (depending on design decisions) which pre-encrypted shared reference file 160 to use (step 950). In the former case, it is necessary to encrypt the shared reference file 160. Once an encrypted version of the shared reference file 160 is on hand, the same method (as in 760) is used to collect the hidden automated key and decrypt the received transmission (step 960).

The receiving server or other device acts upon this data (step 970) according to its established protocols and builds a suitable response to the IoT device (step 980). Encryption of the response is based on current date and time. The software reaches into the encrypted random bytes file 160 to determine a key, following the established pattern in 760. Finally, this device transmits its encrypted response to the IoT device (step 990).

This cycle continues indefinitely through time, without human intervention or concern for traditional symmetric key management.

Figure 11:
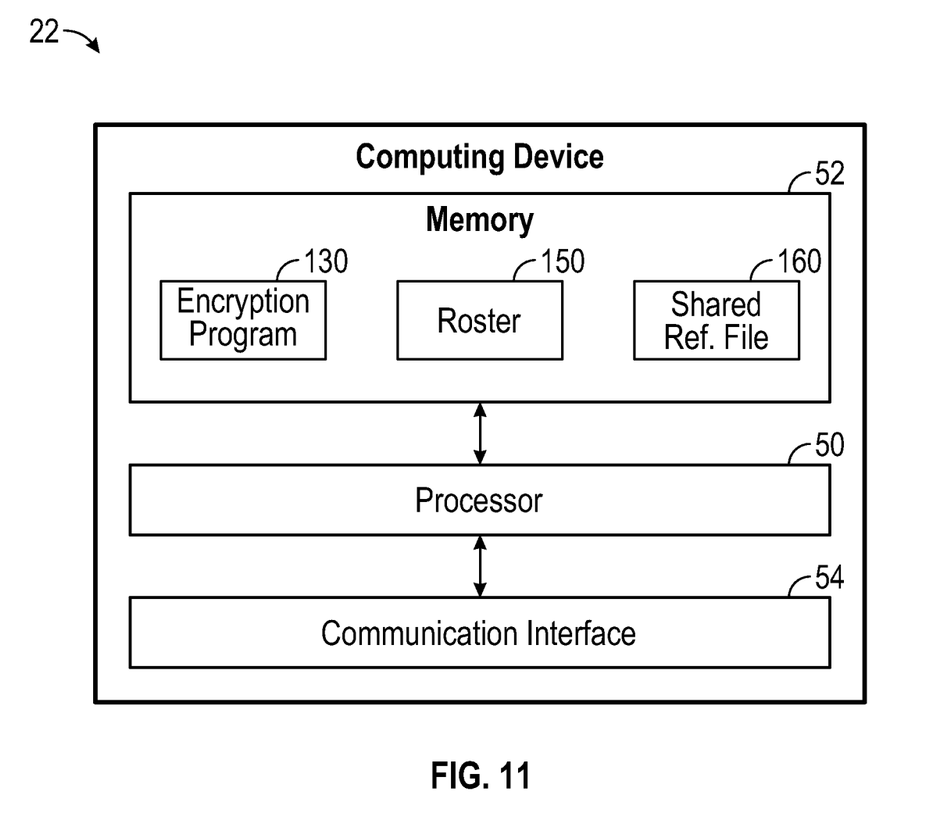
FIG. 11 schematically illustrates an example computing device that may be used in the system of FIG. 1.

FIG. 11 schematically illustrates an example computing device 22 that may be used in the system of FIG. 1, and which may be a server. The same depicted architecture and feature described below can also be used for IoT devices 24.

The computing device 22 includes a processor 50 operatively connected to memory 52 and a communication interface 54. The processor 50 may include one or more microprocessors, microcontrollers, application specific integrated circuits (ASICs), or the like, for example, configured to implement any combination of the steps discussed herein.

The memory 52 can include any one or combination of volatile memory elements, e.g., random access memory (RAM, such as DRAM, SRAM, SDRAM, VRAM, etc.) and/or nonvolatile memory elements (e.g., ROM, hard drive, tape, CD-ROM, etc.). Moreover, the memory 52 may incorporate electronic, magnetic, optical, and/or other types of storage media. The memory 52 can also have a distributed architecture, where various components are situated remotely from one another, but can be accessed, may include as read-only memory (ROM), random-access memory, cache memory, flash memory devices, optical storage devices, etc. As shown in the example of FIG. 11, the memory 52 stores the encryption program 130, the roster 150, and the shared reference file 160.

The communication interface 54 is configured to facilitate communication with other computing devices 22 (e.g., through the WAN 36), and may include a transceiver for wired and/or wireless communication.

Referring again to FIG. 3, although only a single authentication code 240 is shown for each group of one or more users, it is understood that multiple authentication codes 240 could be provided for iterative rounds of encryption. For example, in roster 150A there could be three separate authentication codes for "Abbot, Shirley" with the first authentication code to be used for encrypting the shared reference file 160 to obtain a first key for encrypting the data segment 33, a second authentication code to be used for encrypting the shared reference file 160 to obtain a second key for encrypting the encrypted data segment 34 from the first iteration, and a third authentication code to be used for encrypting the shared reference file 160 to obtain a third key for encrypting encrypted data segment 34 after the second iteration. Thus, in this example there are three authentication codes, three encrypted versions of the shared reference file 160, three encryption keys (each based on a respective one of the encrypted versions of the shared reference file 160), and three iterative rounds of encryption are performed on the data segment 33. Each round could be performed as described above, and could include adding a date-time stamp to the encrypted data segment indicative of a date and time of a corresponding iteration. Thus, confidants 120 desiring greater levels of security could add additional authentication codes to their respective roster entries for each other. Although an example of three authentication codes is discussed above, it is understood that any number of authentication codes (and corresponding quantities of iterations of encryption) could be provided.

The system 10 provides a convenient and secure way to utilize symmetric key encryption through its inventive approach to symmetric key management. Once two confidants 120 mutually agree upon an authentication code, the confidants 120 need never remember the authentication code again. Instead, the confidants 120 only need to remember their respective personal ID codes (if such codes are utilized) so that their respective rosters are accessible. Because the shared reference file 160 is encrypted using the authentication code, and the encryption key 32 for encrypting a given data segment is selected from the encrypted version of the shared reference file 160 based on a time-date stamp, the encryption key 32 frequently evolves, making it elusive to hackers while still being readily available to the confidants 120.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method comprising:
obtaining an encrypted version of a shared reference file that is shared by a group of one or more confidants;
receiving a request from a particular confidant in the group to encrypt a data segment for the group;
selecting a portion of the encrypted version of the shared reference file as an encryption key for the request, said selecting comprising using on a date and time of the request as indices to the encrypted version of the shared reference file; and
encrypting the data segment using the encryption key.

2. The method of claim 1, wherein said obtaining the encrypted version of the shared reference file comprises:
obtaining an authentication code that is shared by the group; and
encrypting a shared reference file using the authentication code as an encryption key to obtain the encrypted version of the shared reference file.

3. The method of claim 2, wherein the shared reference file is at least partially composed of random bytes of data.

4. The method of claim 2, wherein said obtaining the authentication code comprises obtaining the authentication code from a roster of the particular confidant, the roster including an entry for the group that includes the authentication code for the group.

5. The method of claim 4, wherein said obtaining the authentication code comprises:
utilizing a personal identification code of the particular confidant as an encryption key to decrypt the roster, the roster including a plurality of different authentication codes for a plurality of different groups of confidants to which the particular confidant belongs;
wherein the personal identification code is different from the authentication code and the encryption key.

6. The method of claim 1, comprising:
adding a date-time stamp to the encrypted data segment that is based on the date and time of the request;
wherein said adding includes prepending the date-time stamp to the encrypted data segment, appending the date-time stamp to the encrypted data segment, or inserting the date-time stamp between a start and finish of the encrypted data segment.

7. The method of claim 6, wherein the method is performed by an Internet-connected device and comprises:
autonomously generating additional data segments;
iteratively repeating said selecting and encrypting steps for each additional data segment such that for each iteration, a new encryption key is determined and utilized; and
for each iteration, transmitting the encrypted additional data segment to each confidant in the group other than the particular confidant;
wherein the Internet-connected device is part of a single group of confidants; and
wherein the encrypted version of the shared reference file is pre-encrypted and stored at the Internet-connected device.

8. The method of claim 1, wherein the data segment is a first data segment and the encryption key is a first encryption key, the method comprising:
receiving a second encrypted data segment from a confidant in the group, the second encrypted data segment different from the first encrypted data segment;
selecting a portion of the encrypted version of the shared reference file as a second encryption key based on a date and time of a date-time stamp associated with the second encrypted data segment; and
decrypting the second encrypted data segment using the second encryption key;
wherein the second encryption key is different from the first encryption key.

9. The method of claim 8, comprising determining the date-time stamp from unencrypted bits added to the second encrypted data segment, the date-time stamp indicative of when the second encrypted data segment was encrypted.

10. A computing device comprising:
memory storing an encrypted version of a shared reference file that is shared by a group of one or more confidants; and
a processor operatively connected to the memory and configured to:
obtain an encrypted version of the shared reference file that is shared by the group;
receive a request from a particular confidant in the group to encrypt a data segment for the group;
select a portion of the encrypted version of the shared reference file as an encryption key for the request, wherein the selection utilizes a date and time of the request as indices to the encrypted version of the shared reference file; and
encrypt the data segment using the encryption key.

11. The computing device of claim 10, wherein to obtain the encrypted version of the shared reference file, the processor is configured to:
obtain an authentication code that is shared by the group; and
encrypt a shared reference file using the authentication code as an encryption key to obtain the encrypted version of the shared reference file.

12. The computing device of claim 11, wherein the shared reference file is at least partially composed of random bytes of data.

13. The computing device of claim 11, wherein the processor is configured to obtain the authentication code from a roster of the particular confidant, the roster stored in the memory and including an entry for the group that includes the authentication code for the group.

14. The computing device of claim 13, wherein to obtain the authentication code, the processor is configured to:
utilize a personal identification code of the particular confidant as an encryption key to decrypt the roster, the roster including a plurality of different authentication codes for a plurality of different groups of confidants to which the particular confidant belongs;
wherein the personal identification code is different from the authentication code and the encryption key.

15. The computing device of claim 10, wherein the processor is configured to:
add a date-time stamp to the encrypted data segment that is based on the date and time of the request;
wherein to add the date-time stamp the processor is configured to prepend the date-time stamp to the encrypted data segment, append the date-time stamp to the encrypted data segment, or insert the date-time stamp between a start and finish of the encrypted data segment.

16. The computing device of claim 15, wherein:
the computing device is an Internet-connected device that is part of a single group of confidants;
the encrypted version of the shared reference file is pre-encrypted and stored at the Internet-connected device; and
the processor is configured to:
   autonomously generate additional data segments;
   iteratively repeat the selection and encryption steps for each additional data segment such that for each iteration, a new encryption key is determined and utilized; and
   for each iteration, transmit the encrypted additional data segment to each confidant in the group other than the particular confidant.

17. The computing device of claim 10, wherein the data segment is a first data segment and the encryption key is a first encryption key, and the processor is configured to:
   receive a second encrypted data segment from a confidant in the group, the second encrypted data segment different from the first encrypted data segment;
   select a portion of the encrypted version of the shared reference file as a second encryption key based on a date and time of a date-time stamp associated with the second encrypted data segment; and
   decrypt the second encrypted data segment using the second encryption key;
   wherein the second encryption key is different from the first encryption key.

18. A computer program product stored in a non-transitory computer-readable medium, said computer program product comprising program instructions which, when run on a computing device, configures the computing device to:
   obtain an encrypted version of a shared reference file that is shared by a group of one or more confidants;
   receive a request from a particular confidant in the group to encrypt a data segment for the group;
   select a portion of the encrypted version of the shared reference file as an encryption key for the request, wherein the selection utilizes a date and time of the request as indices to the encrypted version of the shared reference file; and
   encrypt the data segment using the encryption key.

\* \* \* \* \*